Dec. 1, 1925.

J. L. DROHEN

SIGNAL

Filed June 13, 1924

J. L. Drohen,
INVENTOR
BY Victor J. Evans
ATTORNEY

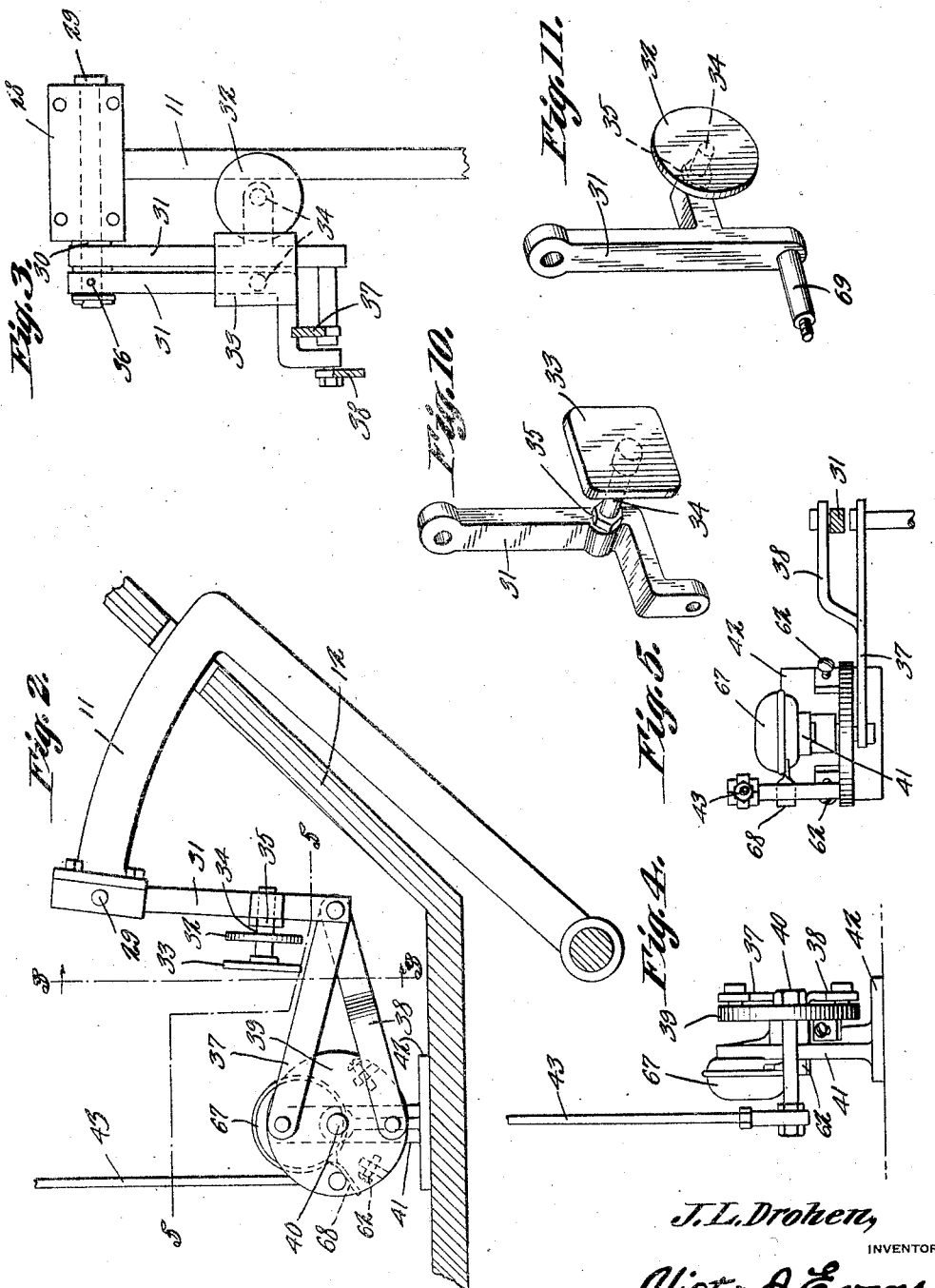

Dec. 1, 1925.   J. L. DROHEN   1,564,130
SIGNAL
Filed June 13, 1924    3 Sheets-Sheet 3
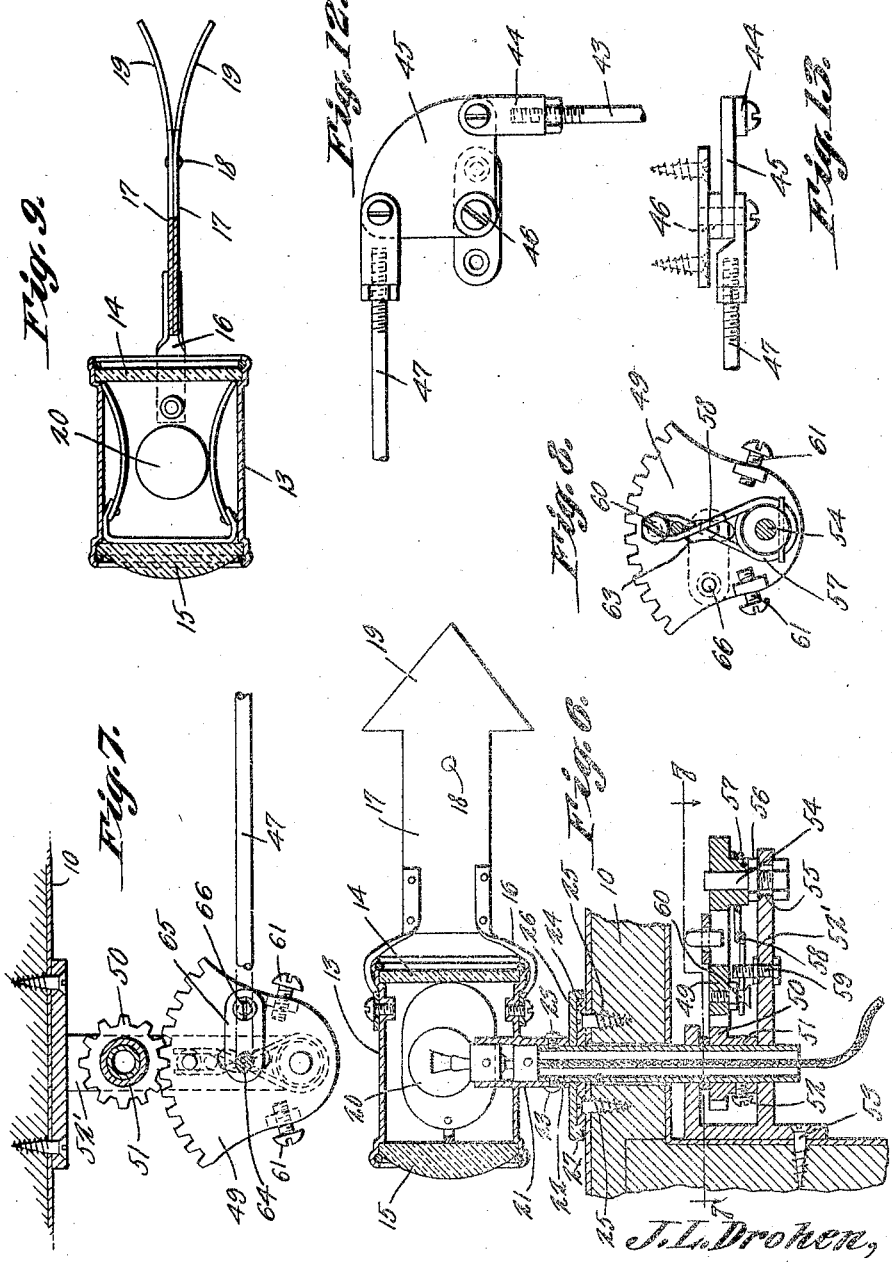

Patented Dec. 1, 1925.

1,564,130

UNITED STATES PATENT OFFICE.

JAMES L. DROHEN, OF DUNKIRK, NEW YORK.

SIGNAL.

Application filed June 13, 1924. Serial No. 719,866.

*To all whom it may concern:*

Be it known that I, JAMES L. DROHEN, a citizen of the United States, residing at Dunkirk, in the county of Chautauqua and State of New York, have invented new and useful Improvements in Signals, of which the following is a specification.

This invention relates to direction signals for vehicles.

In carrying out the invention it is my purpose to mount a signal on the top of a vehicle in a more or less conspicuous position, where it will attract the attention of drivers of other vehicles, the signal being mounted for partial rotation, and adapted to be moved from a normal straight away position either to the right or to the left to indicate the course to be pursued by the vehicle, and also capable of being quickly oscillated to indicate when the vehicle is about to stop.

One of the chief characteristics of this invention resides in the provision of a simple construction of means for controlling the signal from the driver's seat, which means includes amongst other features a pair of foot operated pedals capable of independent movement, depending upon the direction in which it is desired to shift the signal, the pedals being arranged in close proximity so that the same foot of the driver is used to operate either of the pedals.

Another object of the invention resides in arranging the signal operating pedals immediately beneath one of the control pedals of the vehicle, so that the heel of the operator can be used to actuate either of the signal pedals without removing his foot from the control pedal.

A further object of the invention resides in the use of a signal in the form of an arrow projecting forwardly from a lamp casing, so that the arrow can be properly illuminated at night time, the casing being equipped with a lens at the rear end thereof so that the signal can also be readily seen when in its normal straight away position.

I further contemplate the use of an audible signal in conjunction with one of the foot operated pedals, which signal is sounded when the particular pedal is depressed, so that the operator will be properly informed which of the two pedals is used when it is necessary to operate the signal.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 2 is an enlarged detail view of a portion of the signal operating means showing how the signal operated pedals are arranged with relation to the control pedal of the vehicle.

Figure 3 is a view taken on line 3—3 of Figure 2 looking in the direction of an arrow.

Figure 4 is a view taken on line 4—4 of Figure 2.

Figure 5 is a plan view of that part of the operating means shown in Figure 2.

Figure 6 is a vertical sectional view through the signal and a portion of the top of the vehicle showing how the signal is mounted thereon.

Figure 7 is a sectional view taken on line 7—7 of Figure 6.

Figure 8 is a bottom plan view of the toothed segment.

Figure 9 is a sectional view through the signal proper.

Figure 10 is a detail view of one of the signal operated pedals.

Figure 11 is a similar view of the other pedal.

Figure 12 is a fragmentary detail view of the bell crank lever and its connection between the signal and the foot operated pedals.

Figure 13 is a view taken at a right angle to Figure 12.

Figure 1:
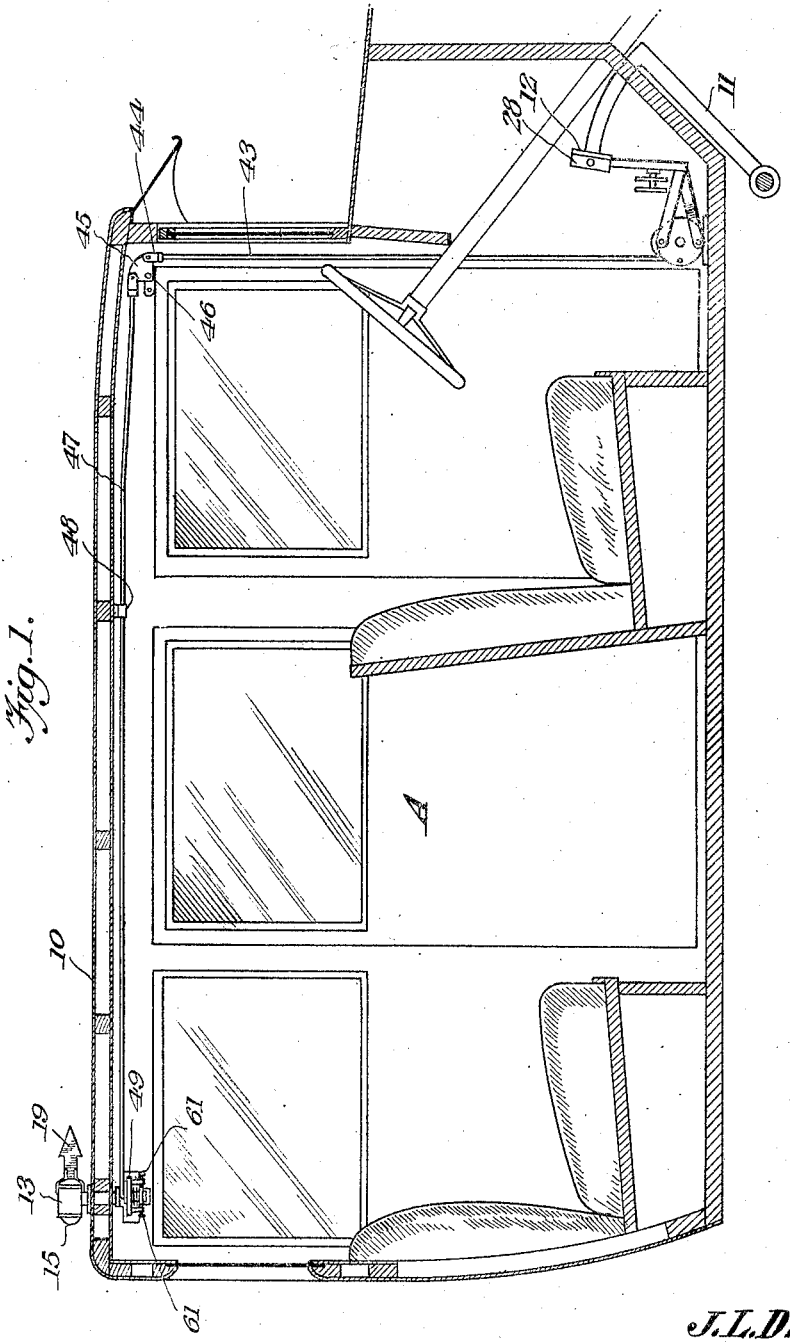
Figure 1 is a fragmentary side elevation of a vehicle body showing the invention arranged thereon.

Referring to the drawings in detail A indicates generally the body of a motor operted vehicle, wherein the top thereof is indicated at 10. 11 represents the shank of one of the control pedals of the vehicle herein indicated at 12. The signal above referred to may be of any construction found suitable for the purpose intended, but I preferably make use of a signal including a lamp casing 13 closed at its opposite ends by lens 14 and 15 respectively. The lens 14 is an ordinary white lens, while the lens 15 is red, as this lens is presented to view of others when the signal is in its normal straight away position. Secured to the front of the casing and projecting forwardly therefrom is a clamp 16 which is designed to embrace and support a pair of arrows 17 and the major portion of its arrows are riveted or otherwise suitably secured together at 18 in face to face contact. The remaining or pointed extremities of the arrows are flared outwardly as at 19 as clearly shown in Figure 9, so that these portions lie in the path of the light rays emitted from the lamp casing and thereby properly illuminated at night time. The lamp casing receives a bulb 20, which is supported on a tubular member 21 which projects within the lamp casing, the lower portion of this tubular member receiving the adjacent end of a hollow shaft 22 to which it is secured by suitable fastening elements 23. This shaft is journaled in an opening in the top 10 of the vehicle as clearly shown in Figure 6, a portion of the shaft projecting above the top of the vehicle and connected with the tubular member 21 as described. In order to provide a weather proof joint between these parts, I make use of a gasket 24 which surrounds the shaft 22 and reposes upon the top 10 of the vehicle, to which it is secured by suitable fastening elements 25. This gasket is then covered by an annular flange 26 which forms an integral part of the shaft 22, and which flange has its outer edge turned downwardly as at 27 to snugly embrace the gasket 24. It is to be born in mind that the shaft 22 together with the signal as a whole is mounted for rotation in the opening formed in the top 10, and that the signal normally occupies a straight away position. But, the signal is capable of being swung to either the right or to the left to indicate the course to be pursued by the vehicle, or capable of being quickly oscillated to indicate to others that the vehicle is about to stop, and the mechanism for controlling the movements of this signal will be presently described. This mechanism includes a block 28 which is secured in any suitable manner to the control pedal 12 of the vehicle. Passed longitudinally through this block and mounted for rotation therein is a headed element, the head of which is indicated at 29 and is arranged to bear against one end of the block, while the shank 30 of said element projects an appreciable distance beyond the other end of said block and from which end is suspended the shanks 31 of the foot operated pedals 32 and 33 respectively. It will be noted from an inspection of Figure 3 that these pedals are arranged side by side and in such close proximity, that the same foot of the operator can be used for actuating either pedal, it being manifest that when the pedal 32 is depressed, the signal will be shifted to the right, and that when the pedal 33 is actuated the signal will be shifted to the left. It will be further noted that the shank of the pedal 32 is offset so as not to interfere with the operation of the other pedal and shank. If desired either pedal can be adjusted on its shank, by simply turning the pin 34 which supports the pedal, which pin is threaded into its respective shank, and held in a given position by means of a lock nut 35, which construction is illustrated in Figures 10 and 11. The shank of the pedal 32 is loosely mounted upon the shank 30 of the element passed through the block 28, while the shank of the pedal 33 is keyed or otherwise fixed to the shank 30 as at 36. Consequently either of the pedals can be operated independently of the other, so that the signal can be shifted in the proper direction to indicate to others which course the vehicle is about to pursue.

Projecting from the lower extremities of the shanks 31 are links 37 and 38, both of which are supported from pins projecting at a right angle from said extremities, the link 37 being connected with the shank of the pedal 32, while the link 38 is connected with the shank of the pedal 33. These links are arranged in divergent relation as shown in Figure 2 and are terminally connected with a disk 39 at diametrically opposite points, the link 37 being connected at a point adjacent the top of the disk, while the link 38 is connected at a point adjacent the bottom of the disk. The disk 39 is pivoted as at 40 on a bracket 41, the body portion of which rises from a suitable base 42 which is secured to the floor board of the vehicle. Connected to this disk adjacent the periphery thereof is a vertically disposed rod 43 the upper end of which is connected as at 44 to a bell crank lever 45, which is pivoted on the body of the vehicle as at 46. Connected with the other extremity of this bell crank lever is a horizontally disposed rod 47 which is arranged directly beneath the top 10 of the vehicle as shown in Figure 1, and is mounted for reciprocatory movement through a suitable guide 48. The other end of this rod 47 is connected with a toothed segment 49, the teeth of which mesh with a small gear 50, the hub 51 of which is secured in any suitable manner as at 52 to the hollow shaft 22 above referred to. The toothed segment 49 is pivoted on a suitable bracket 52 which is secured to one side of the vehicle body as at 53, the pivot for said segment being indicated at 54 and passed through a slot 55 in said bracket, which permits of a slight adjustment of the segment toward the gear 50 to compensate for wear, and consequently take up any lost motion which may occur between these parts. A nut 56 is threaded on the pivot pin 54 and cooperates with the head of the pin to support the latter in its position on the bracket. The segment is held in its normal position, and returned to normal position after each operation, by means of a spring including a coil 57 which surrounds the hub of the toothed segment as clearly shown in Figure 6, and which spring further includes crossed limbs 58 clearly shown in Figure 8. These limbs terminate to provide substantially parallel portions which are arranged at opposite sides of the pins 59 and 60 respectively, the former being stationary and supported by the bracket 52, while the latter depends from the toothed segment 49 and is consequently movable therewith. Manifestly when the segment is moved in either direction, the pin 60 flexes one or the other of the limbs 58 of said spring, thereby tensioning the latter so that when the foot is removed from the operating pedal the spring functions to return the segment as well as the signal to its normal position. Carried by the opposite sides of the segment are adjustable stop pins 61 which are arranged to contact the sides of the bracket 52 to limit the movement of the segment in either direction. Similar stop pins 62 are also carried by the disk 39, and cooperate with the body portion 41 of the bracket to limit the turning movement of this disk in either direction.

It will be noted upon inspection of Figures 6 and 7 that I have provided an adjustable connection between the horizontally disposed rod 47 and the segment 49, which connection preferably consists of providing the segment with an arcuate shaped slot 63 to receive the downturned extremity 64 of the rod 47. This downturned extremity also passes through an opening formed in a link 65 which is secured to the segment at its opposite end by means of a fastening element 66. Manifestly the link can be loosened at 66 and shifted to position the downturned extremity 64 of said rod in different positions within the slot 63, to vary the leverage or throw of the segment as may be desired. After the downturned extremity 64 has been properly positioned within the slot 63 the link 65 is secured and held fixed relatively to the segment by means of the fastening element 66.

Disposed in juxtaposition with the disk 39 is an audible signal in the nature of a bell indicated at 67 and including the usual manipulating element 68 which is diposed in the path of movement of the pin 69 which provides the connection between the shank of the pedal 32 and the link 37 above referred to. By reason of this arrangement, it will be observed that when the pedal 32 is depressed to turn the signal to the right, the manipulating element 68 of said bell will be actuated to sound the latter thus informing the driver that he has depressed the particular pedal 32. The signal is not sounded when the pedal 33 is depressed, so that by use of the signal the operator can readily and quickly determine which pedal he has depressed without looking down at the pedals, and thus allowing him to keep his eyes to the front at all times for the proper guidance of the vehicle.

In practice, the signal normally occupies the position shown in Figure 1, with the arrows pointing straight ahead. Now, if the driver contemplates turning to the right at the next street intersection, it is only necessary to depress the pedal 32 which turns the disk 39 in a clockwise direction, thereby lifting the rod 43, which turns the bell crank lever 45 to move the rod 47 rearwardly under the top of the vehicle. The tooth segment is simultaneously shifted in the same direction, and as this segment meshes with the gear 50 the latter together with the signal is turned to the right. During this operation one of the limbs 58 of the spring associated with the segment is placed under tension, so that when the pedal 32 is released the segment together with the signal and other movable parts are automatically returned to their normal position. Conversely when the pedal 33 is depressed the rod 43 is moved downwardly, thereby sliding the rod 47 in a forward direction, and reversing the movement of the segment 49 with a result that the signal is shifted to the left. If it is desired to oscillate the signal to indicate to others that the driver is about to stop the vehicle, it is only necessary to work one of the pedals up and down with a quick motion.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:

1. A signal operating mechanism including a gear associated with the signal, a toothed pivoted segment meshing with said gear, a sliding rod terminally connected with said segment and operable to control the movements of said signal, a pair of foot operated pedals adapted to be singly actuated, a connection between said pedals and segment, resilient means for automatically retaining said segment and signal to their normal positions when the operating pedal is released, and an adjustable connection between said rod and segment, whereby the throw of said pedal can be varied.

2. A signal operating mechanism including a gear associated with the signal, a toothed pivoted segment meshing with said gear, a pair of foot operated pedals adapted to be singly actuated, a rotatable disk, links projecting from said pedals and connected with said disk at diametrically opposite points whereby said disk can be rotated in one or the other direction, means connecting said disk with the signal and including a bell crank lever, rods connected with said lever and arranged in right angular relation, an adjustable connection between one of said rods and said segment, whereby the throw of said pedals can be varied, and means for automatically returning said segment and signal to their normal positions when the operating pedal is released.

In testimony whereof I affix my signature.

JAMES L. DROHEN.